(12) United States Patent
Byun et al.

(10) Patent No.: US 12,203,199 B2
(45) Date of Patent: Jan. 21, 2025

(54) AUTOMATIC TEXTILE WINDING SYSTEM WITH MULTI-STRANDED ROTATABLE YARN FEED

(71) Applicant: NIKE, Inc., Beaverton, OR (US)

(72) Inventors: EunYoung Byun, Busan (KR); HoEun Kim, Busan (KR); HyunWoo Jeon, Busan (KR); SangWook Jeon, Busan (KR); Hyo Young Kim, Busan (KR); TaeYoon Kim, Busan (KR); DongHoon Lee, Busan (KR)

(73) Assignee: NIKE, Inc., Beaverton, OR (US)

( * ) Notice: Subject to any disclaimer, the term of this patent is extended or adjusted under 35 U.S.C. 154(b) by 219 days.

(21) Appl. No.: 17/944,957

(22) Filed: Sep. 14, 2022

(65) Prior Publication Data
US 2023/0083354 A1      Mar. 16, 2023

Related U.S. Application Data

(60) Provisional application No. 63/243,960, filed on Sep. 14, 2021.

(51) Int. Cl.
*D04H 3/04* (2012.01)
*A43B 1/05* (2022.01)
(Continued)

(52) U.S. Cl.
CPC ............... *D04H 3/12* (2013.01); *A43B 1/05* (2022.01); *B32B 5/024* (2013.01); *B32B 5/18* (2013.01);
(Continued)

(58) Field of Classification Search
CPC ............ D04H 3/04; D04H 3/045; D04H 3/05; D04H 3/07; D04H 3/12; D04H 3/005;
(Continued)

(56) References Cited

U.S. PATENT DOCUMENTS 2,812,797 A * 11/1957 Estee ............... D21H 27/34
                                                 156/440
3,000,432 A *  9/1961 Olken ............... D04H 3/04
                                                 156/181

(Continued)

FOREIGN PATENT DOCUMENTS

| CN | 1769562 A   | 5/2006 |
| CN | 107938177 A | 4/2018 |

(Continued)

*Primary Examiner* — Amy Vanatta
(74) *Attorney, Agent, or Firm* — Quinn IP Law

(57) ABSTRACT

A system for forming a non-woven, yarn structure for an engineered textile includes a jig having a plurality of upstanding pins and an automatic winding system for winding a plurality of continuous strands of yarn across the jig and around the upstanding pins. The automatic winding system includes a movement mechanism and a winding head coupled with the movement mechanism. The movement mechanism includes one or more motors that are configured to translate the winding head across a central workspace area of the jig. The winding head includes a rotatable base; a plurality of yarn guides arranged in a linear array and extending from the rotatable base, each yarn guide adapted to receive a different one of the continuous strands, and a rotation motor coupled to the rotatable base and configured to selectively rotate the base to alter an orientation of the linear array.

17 Claims, 6 Drawing Sheets

(51) Int. Cl.
  *B32B 5/02* (2006.01)
  *B32B 5/18* (2006.01)
  *B32B 5/24* (2006.01)
  *B32B 5/26* (2006.01)
  *B32B 7/14* (2006.01)
  *B32B 37/00* (2006.01)
  *B32B 37/12* (2006.01)
  *B32B 37/24* (2006.01)
  *D04H 3/05* (2006.01)
  *D04H 3/12* (2006.01)

(52) U.S. Cl.
  CPC ............ *B32B 5/245* (2013.01); *B32B 5/275* (2021.05); *B32B 7/14* (2013.01); *B32B 37/0076* (2013.01); *B32B 37/1292* (2013.01); *B32B 37/24* (2013.01); *D04H 3/04* (2013.01); *D04H 3/05* (2013.01); *B32B 2250/02* (2013.01); *B32B 2250/20* (2013.01); *B32B 2255/02* (2013.01); *B32B 2255/26* (2013.01); *B32B 2305/022* (2013.01); *B32B 2305/188* (2013.01); *B32B 2305/20* (2013.01); *B32B 2307/51* (2013.01); *B32B 2437/02* (2013.01); *D10B 2401/061* (2013.01); *D10B 2501/043* (2013.01)

(58) Field of Classification Search
  CPC ..... B29C 70/38; B29C 70/382; B29C 70/386; B29C 64/118; A43B 1/05; A43B 23/0225; A43B 23/0235; A43B 23/0255; A43B 23/0265; A43B 1/02; B32B 5/024; B32B 5/275; B32B 7/14; B32B 37/0076; B32B 37/1292; B32B 37/24; B32B 2250/02; B32B 2250/20; B32B 2255/02; B32B 2305/188; B32B 2305/20; B32B 2307/51; B32B 2437/02; B32B 5/028; B32B 5/265; B33Y 10/00; B33Y 80/00
  See application file for complete search history.

(56) References Cited

U.S. PATENT DOCUMENTS

| | | | | |
|---|---|---|---|---|
| 3,639,954 | A * | 2/1972 | Kirzinger | D04H 3/04 156/439 |
| 3,878,591 | A * | 4/1975 | Jense | D04H 3/04 28/100 |
| 5,772,821 | A * | 6/1998 | Yasui | D04H 18/00 442/205 |
| 7,120,975 | B2 * | 10/2006 | Delecroix | F16D 69/023 28/103 |
| 8,141,215 | B2 * | 3/2012 | Yoshikawa | B29C 70/382 28/100 |
| 10,874,172 | B2 | 12/2020 | Corcoran-Tadd | |
| 2003/0052212 | A1 * | 3/2003 | Anderson | B29C 70/382 242/444 |
| 2003/0140467 | A1 * | 7/2003 | Cahuzac | B29C 70/228 28/103 |
| 2006/0090314 | A1 | 5/2006 | Delecroix | |
| 2007/0090564 | A1 * | 4/2007 | Delecroix | D04H 3/002 264/258 |
| 2009/0126875 | A1 * | 5/2009 | Uozumi | B29C 53/64 156/425 |
| 2010/0071177 | A1 | 3/2010 | Yoshikawa et al. | |
| 2010/0218902 | A1 | 9/2010 | Yoshikawa et al. | |

FOREIGN PATENT DOCUMENTS

| | | |
|---|---|---|
| CN | 212826966 U | 3/2021 |
| DE | 3003666 A1 | 8/1981 |
| EP | 3549470 A1 | 10/2019 |
| WO | 2021087247 A1 | 5/2021 |

* cited by examiner

AUTOMATIC TEXTILE WINDING SYSTEM WITH MULTI-STRANDED ROTATABLE YARN FEED

CROSS-REFERENCE TO RELATED APPLICATIONS

The present disclosure claims the benefit of priority from U.S. Provisional Patent No. 63/243,960, filed 14 Sep. 2021, which is incorporated by reference in its entirety and for all that it discloses.

TECHNICAL FIELD

The present disclosure generally relates to systems and methods for creating yarn structures for non-woven engineered textiles that may be used in constructing articles of functional apparel. More specifically, aspects of this disclosure relate to systems that can automatically wind yarns or yarn-like materials across a jig to create a custom non-woven yarn pattern that is tailored to a particular application.

BACKGROUND

In typical apparel production, discrete patterns/panels are cut from a pre-produced roll of fabric and then seamed together to form the final article. To maintain its integrity as a sheet, the rolled fabric must include its own intrinsic structure, which often takes the form of a weave or knit. In many instances, this structure is needed only to provide integrity to the cloth and has no functional purpose in the completed article.

In certain items of functional apparel (e.g., footwear, sports bras, compression gear (e.g., shorts, pants, shirts, sleeves), joint braces (e.g., ankle, knee, wrist, elbow), and the like), the performance of the article depends on certain strength and/or elasticity in specific directions. For example, a compression sleeve for a leg may require a particular circumferential elasticity to provide optimal compression, though may also require a particular longitudinal elasticity across the anterior portion of the knee to permit joint flexure. Footwear involves even more complex motions with lateral containment requirements to promote stability on the footbed, pronation/supination, and dorsiflexion during a typical gait. In many instances, the intrinsic structure of pre-produced/rolled fabrics is sub-optimally arranged to meet the functional demand requirements of the article. As such, secondary structure must be applied (e.g., reinforcing cables, or secondary sections of fabric), which can contribute to increased material usage/waste (i.e., additional die-cut patterns and the off-cut waste associated with them) and increased weight in the final article.

SUMMARY

The present disclosure contemplates a new way to construct a textile that both reduces off-cut waste and tailors the intrinsic structure of the textile to the specific functional requirements of the final article. In doing so, an apparel/footwear designer may have more design freedom to specify directional elasticities and strength of the textile and final article without adding additional weight or secondary reinforcing structure.

According to the present disclosure, an automated system for forming a yarn structure for use in creating an engineered textile includes a jig having a plurality of upstanding pins that collectively circumnavigate a central workspace area, and an automated winding system. The jig is particularly adapted to have a continuous strand of yarn strung a plurality of times across the central workspace area between various point along the perimeter of the jig.

In some embodiments, to increase the manufacturing throughput of the system, the automatic winding system is adapted to simultaneously wind multiple continuous strands of yarn around the pins and across the central workspace through the use of a plurality of discrete yarn guides, each being adapted to receive and draw a different respective yarn strand across the workspace area at the same time. In an effort to accommodate various jig-pin spacings as well as to accommodate a jig-pin path that traverses a nonlinear profile, the array of yarn guides may be selectively rotatable to achieve a desired angle relative to the pins/jig.

The automatic winding system includes a movement mechanism and a winding head coupled with the movement mechanism. The movement mechanism includes one or more motors that are configured to translate the winding head across the workspace area. The winding head includes a rotatable base, the plurality of yarn guides arranged in a linear array and extending from the rotatable base; and a rotation motor coupled to the rotatable base and configured to selectively rotate the base to alter an orientation of the linear array.

In some embodiments, the system further comprises a winding controller in electrical communication with the one or more motors of the movement mechanism. The winding controller comprises a digital memory having stored therein instructions that when executed by the winding controller, cause the one or more motors to translate the winding head across the workspace area along a predefined path. The winding controller may also be in electrical communication with the rotation motor, and the instructions, when executed by the winding controller, may also cause the rotation motor to rotate the rotatable base of the winding head and alter the orientation of the linear array. In doing so, the winding controller may be configured to cause the rotation motor to rotate the rotatable base of the winding head as a function of one or both of the position of the winding head within the workspace, or the position of the winding head relative to an arrangement of the plurality of pins on the jig.

During operation the movement mechanism is operative to translate the winding head across the workspace and then to loop or circumnavigate around one or more pins by exiting the workspace at a first location and then re-entering the workspace at a second location. More specifically, during this looping, a yarn guide (of the plurality of yarn guides) exits the workspace area by passing between a first pair of adjacent upstanding pins from the plurality of upstanding pins, and subsequently reenters the workspace area by passing between a second pair of adjacent upstanding pins from the plurality of upstanding pins. In doing so, the yarn guide may loop one of the continuous strands of yarn around the outside of one or more pins.

In some embodiments, the present disclosure relates to an automatic winding system for winding a plurality of yarn strands across a jig having a plurality of upstanding peripheral retention pins disposed around a central workspace area. This automated winding system includes a winding head, a movement mechanism coupled with the winding head and including a plurality of motors operative to controllably translate the winding head across the workspace area, and a winding controller. The winding head includes a rotatable base, a plurality of yarn guides arranged in a linear array and extending from the rotatable base; and a rotation motor coupled to the rotatable base and configured to selectively rotate the base to alter an orientation of the linear array.

The winding controller is in electrical communication with each of the plurality of motors of the movement mechanism, and is configured to operate the movement mechanism to draw a plurality of continuous strands of yarn across the workspace area between and around the plurality of upstanding peripheral retention pins. Each continuous strand of yarn extends through a different respective thread guide of the plurality of thread guides. The winding controller may further be in communication with the rotation motor and is configured to cause the rotation motor to rotate the rotatable base of the winding head and alter the orientation of the linear array. The winding controller may be configured to cause the rotation motor to rotate the rotatable base of the winding head as a function of at least one of the position of the winding head within the workspace or the position of the winding head relative to the pins.

Figure 1:
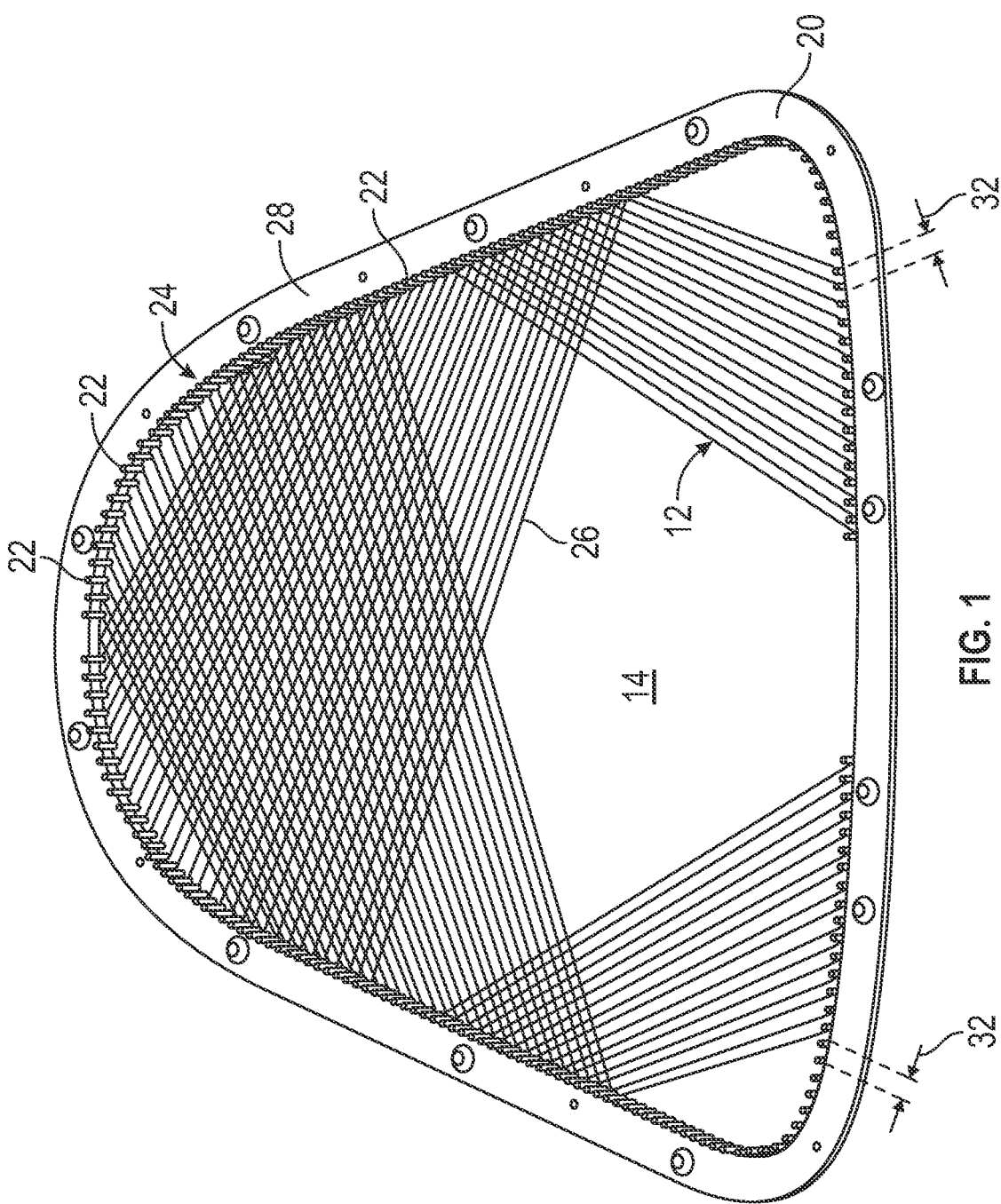
FIG. 1 schematically illustrates a pin-jig/fixture used to create a multi-directional yarn structure having a plurality of yarn strands extending linearly across a workspace.

The present disclosure is amenable to various modifications and alternative forms, and some representative embodiments are shown by way of example in the drawings and will be described in detail herein. It should be understood, however, that the novel aspects of this disclosure are not limited to the particular forms illustrated in the above-enumerated drawings. Rather, the disclosure is to cover all modifications, equivalents, combinations, sub-combinations, permutations, groupings, and alternatives falling within the scope of this disclosure as encompassed by the appended claims.

DETAILED DESCRIPTION

The present disclosure generally relates to systems, methods, and techniques for creating a yarn structure that may be used in the creation of non-woven engineered textiles and/or textile-like composite structures. These engineered textiles may be particularly suited for use in constructing articles of functional apparel. As used herein, the term "functional apparel" is intended to include any article of apparel or footwear that has a use or purpose beyond simply aesthetics or body coverage. Examples of functional apparel may include articles of footwear, sports bras, compression gear (e.g., shorts, pants, shirts, sleeves), joint braces (e.g., ankle, knee, wrist, elbow). In particular, this disclosure presents a system for constructing a non-woven engineered yarn structure by automatically winding a plurality of continuous strands of yarn across a jig a plurality of times. At the termination of each pass across the jig, the continuous strands of yarn may be looped around an upstanding pin prior to beginning the next pass. This engineered yarn structure may subsequently be processed to bond one or more of the yarn strands together (i.e., to provide material integrity), and the resultant product may be used in a specifically oriented manner to form the article of functional apparel.

In general, the present designs/techniques are useful in creating a new class of application-specific textile-like composite structures that are structurally engineered to have specific dimensional material properties that are tailored to the end use of the textile. For the purpose of this disclosure, the term "yarn structure" is intended to refer to the total collection of yarn strands or windings that extend across the workspace of a pin jig in a predefined arrangement or pattern. Within the workspace, the respective yarn strands (which may or may not be formed from a continuous strand of yarn) may overlap or intersect, though are preferably not directly interconnected with other yarn strands (i.e., via twisting, knotting, looping, crocheting, weaving) Instead, following the creation of the yarn structure, a bonding material may be printed or extruded onto the yarn structure for the purpose of selectively securing the yarn strands together to form the "engineered textile." By forming the engineered textile in this manner, the yarn strands may be aligned with the expected load paths or the directions of expected tensile loading in the final article, with the elasticity of each yarn strand being selected to control the dynamic response of the engineered textile to an applied load during use.

The present designs (or designs capable of being produced from the present systems) are unlike and distinguishable from traditional textiles, which are typically produced in bulk and often utilize a generic or repeating yarn structure that is application agnostic. Such traditional textiles, often derive their material structure from the physical engagement or interlocking of adjacent yarn strands, such as by weaving, looping, knitting, or knotting. Since the patterns/panels are often cut from larger bolts of generically constructed fabric, a designer has little ability to control or vary localized material properties of a pattern/panel absent the inclusion of additional reinforcing structure. Thus, by providing a designer with specific control of yarn arrangement and material parameters across the panel, the engineered textiles of the present disclosure may result in a more optimal/optimized structure that is both lighter and requires less secondary reinforcement than a traditional textile material.

While the present techniques provide greater design freedom to control/engineer the material response of the final panel, they also provide substantial environmental benefits. For example, by creating a more optimally designed textile, less total material is required in the construction. Additionally because each panel is made in an additive manner, there is comparatively little waste or off-cut material associated with the manufacturing as well.

While these engineered textiles may be utilized with any article of functional apparel, they may find particular utility within the field of footwear construction, as footwear design is a unique blend of form and function with numerous competing design considerations. More specifically, a shoe must be sufficiently stiff to provide proper containment, while being sufficiently flexible to allow the foot to naturally move and flex. In this context, by selecting and placing/orienting yarn strands with appropriate elasticities, the textile may achieve specific and deliberate directional strengths at the lowest possible weight or fiber density.

As noted above, the yarn structures generated through the present systems may be used in the creation of engineered textiles once the respective yarn strands are bonded or interconnected together via a suitable bonding material. As used herein, the term "yarn" is understood to refer to a long or essentially continuous strand of fibers, or filament(s) in a form suitable for knitting, weaving, crocheting, braiding, or otherwise intertwining with other yarns or segments of the same yarn, or for use in sewing including embroidery. Types of yarns include continuous filament yarns, examples of which include monofilament yarns (consisting of a single continuous filament) and multi-filament yarns (consisting of a plurality of flat or textured filaments which are typically twisted or air-entangled with each other). Spun yarns are another type of yarn, which consist of a plurality of staple fibers (such as cotton or wool fibers) or cut fibers or filaments which are entangled with each other in the spinning process. Complex yarns are yet another type of yarn, which may consist of a cord or cabled yarn, or which may consist of two or more single yarn strands combined into a ply yarn. Natural fibers or filaments may be used, including naturally-occurring cellulosic fibers such as cotton or flax, naturally-occurring protein-based fibers or filaments such as wool or silk, and naturally-occurring mineral-based materials such as asbestos. Man-made fibers or filaments may be used, including man-made fibers or filaments made from inorganic materials such as glass or metals, as well as fibers or filaments made from regenerated natural polymers, including cellulose-based polymers and protein-based polymers, man-made carbon fibers or filaments, and man-made fibers or filaments made from synthetic polymers. In many cases, the synthetic polymers are thermoplastics, including thermoplastic elastomers, although thermosets such as elastane may also be used. Synthetic polymers commonly used to make fibers or filaments include polyesters (such as polyethylene terephthalate (PET)), polyamides (such as Nylon-6, Nylon 6,6, and Nylon-11), polyolefins (such as propylene homopolymers and copolymers, as well as ethylene homopolymers and copolymers), and polyacetates (such as cellulose acetate fibers). Polyurethanes, such as thermoplastic polyurethanes, may also be used to make fibers or filaments. The strands may comprise or consist of yarn including natural fibers or filaments, man-made fibers or filaments, or a combination of both natural and man-made fibers or filaments, such as a spun yarn comprising a blend of cotton and polyester fibers. The strands may comprise or consist of a multi-filament yarn comprising polyester or polyamide filaments, such as a commercially available embroidery thread.

Generally, industrial knitting machines and other industrial-scale manufacturing processes require the use of yarns having a minimum tenacity of about 1.5 grams per denier. Tenacity refers to the amount of force needed to break a yarn divided by the linear mass density of the yarn, and is determined by subjecting a sample of the yarn to a known amount of force until the sample breaks, for example, using a strain gauge load cell. Lower tenacity yarns have tenacities ranging from about 2.5 to about 4 grams per denier, while medium tenacity yarns have tenacities ranging from about 5 to about 10 grams per denier. Yarns having tenacities greater than about 11 grams per denier are considered to be high tenacity yarns. High-tenacity yarns may include fibers or filaments comprising polymer such as aramids and ultra-high molecular weight polyethelene (UHMWPE). The yarns used in accordance with the present disclosure can be lower tenacity yarns, medium tenacity yarns, high tenacity yarns, or any combination thereof. In some examples, the strands may comprise or consist of a spun yarn, a mono-filament yarn, or a multi-filament yarn having a tenacity of at least 1.5 grams per denier, or of at least 2.5 grams per denier. In other examples, the strands may comprise or consist of a multi-filament yarn having a tenacity of at least 11 grams per denier.

Once the yarn structure is formed, the strands may be bonded or interconnected via an applied bonding material to form a textile that may retain its shape absent a supporting frame. The bonding material used to bond the yarn strands to each other is a polymeric material comprising one or more polymers. All of the polymers present in the bonding material (i.e., all of the one or more polymers) are referred to as the bonding material polymeric component. The bonding material may also include one or more optional non-polymeric ingredients, referred to as the bonding material non-polymeric component. Examples of non-polymeric ingredients include fillers, processing aids, anti-yellowing additives, plasticizers, pigments, and any combinations thereof. The bonding material may be a thermoplastic bonding material comprising one or more thermoplastic polymers. The bonding material may be an elastomeric bonding material comprising one or more elastomeric polymers. An elastomer may be defined as a material having an elongation at break greater than 100 percent, or greater than 200 percent, or greater than 400 percent, as determined using ASTM D-412-98 at 25 degrees Celsius. The elastomeric bonding material may have an elongation at break greater than 100 percent, or greater than 200 percent, or greater than 400 percent, as determined using ASTM D-412-98 at 25 degrees Celsius. The bonding material may be a thermoplastic elastomeric bonding material comprising one or more thermoplastic elastomers. At the point that the bonding material is applied to the yarn strands, it may be thermoplastic, and may remain thermoplastic after solidifying. In one example, prior to being applied to the yarn strands, the bonding material may comprise pre-polymers, such as two pre-polymers which react with each other in a polymerization reaction, and which cure into a solid bonding material (typically a thermoset solid bonding material) after being applied to the yarn strands. In another example, at the point the bonding material is applied to the yarn strands, it may be thermoplastic, and may solidify into a thermoset bonding material (e.g., if a crosslinking reaction is initiated during the printing or extruding step, or during the solidification step), or, after application and solidification, a solid thermoplastic bonding material may be crosslinked to form a thermoset bonding material (e.g., if a solid bonding material is crosslinked using electron beam radiation, or if a reactive solid bonding material is cured by exposure to heat or moisture). In such examples, the bonding material may further comprise a polymerization initiator or cross-linking agent when it is applied to the yarn strands.

The one or more polymers of the bonding material (i.e., the polymeric component of the bonding material) may comprise or consist essentially of one or more thermoplastic elastomer (TPE), including a TPE chosen from a thermoplastic polyurethane elastomer, a thermoplastic polyester elastomer, and a thermoplastic styrene-ethylene/butylene-styrene (SEBS) block copolymer elastomer. The one or more polymers of the bonding material may comprise or consist essentially of one or more crosslinked elastomers, such as polybutadiene or polyisoprene, or a polysilane or polysiloxane. The one or more polymers of the bonding material may comprise or consist essentially of a thermoplastic vulcanizate (TPV) including a crosslinked elastomer phase distributed in a continuous thermoplastic phase. The one or more polymers of the bonding material may comprise or consist essentially of a polymer chosen from a polyurethane, a polyurea, a polyester, a polyether, a vinyl polymer, a polyolefin, an acetate polymer, an acrylate or methacrylate polymer, a polystyrene, a polysilane, a polysiloxane, a polycarbonate, and any combination thereof, including homopolymers and copolymers thereof. The one or more polymers of the bonding material may comprise or consist essentially of a polyurethane, including a polyurethane chosen from an elastomeric polyurethane, a thermoplastic polyurethane (TPU), an elastomeric TPU, and combinations thereof. The thermoplastic elastomeric TPU may comprise or consist essentially of a polyurethane copolymer such as a polyester-polyurethane or a polyether-polyurethane or a combination thereof. The one or more polymers of the bonding material may comprise or consist essentially of polyurea. The one or more polymers of the bonding material may comprise or consist essentially of a polyamide homopolymer, or of a polyamide copolymer, including a polyether block polyamide (PEBA) copolymer. The one or more polymers of the bonding material may comprise or consist essentially of a vinyl copolymer such as ethylene-vinyl acetate (EVA) or ethylene-vinyl alcohol (EVOH). The one or more polymers of the bonding material may comprise or consist essentially of a polyolefin homopolymer or copolymer, such as a polypropylene or polyethylene homopolymer, or a copolymer of propylene or ethylene. The one or more polymers of the bonding material may comprise or consist essentially of a styrene copolymer such as poly(styrene-butadiene-styrene) (SBS), or a styrene-ethylene/butylene-styrene (SEBS) block copolymer. The polymer can comprise or consist essentially of one or more thermoplastic polymers selected from the group consisting of a polyester, a polyamide, a polyurethane, a polyolefin, homopolymers and copolymers of each, and combinations thereof.

While a single bonding material may be used as described herein, a first and a second bonding material may also be used. The first and second bonding materials may be used to bond different areas of a single set of yarn strands, or may be used to bond different layers of yarn strands, such as first and second layers of yarn strands. The polymeric component of the first and second bonding polymers may both comprise one or more shared polymers, such as, for example, one or more shared TPEs. The polymeric component of the first and second bonding materials may consist of the same polymers but in different proportions. The polymeric component of the first and second bonding materials may consist of the same polymers in the same proportions. The first and second bonding materials may differ from each other only in the type or concentration of pigments present.

FIG. 1 generally illustrates one embodiment of a yarn structure 10 for use in the creation of an engineered textile. The illustrated yarn structure 10 was formed by winding one or more continuous strands of a yarn 12 across the central workspace area 14 of a jig 20 a plurality of times. As shown, the jig 20 includes a plurality of upstanding pins 22 provided around an outer periphery 24 such that the pins 22 collectively circumnavigate the central workspace area 14. As noted above, at the end of each pass across the workspace area 14, the continuous strand of yarn 12 may be wrapped/looped around an upstanding pin before it begins a subsequent pass across the central workspace area 14. Once winding is complete the created yarn strands (i.e., the segments extending across the workspace and between opposite pins) may be secured together with an overlaid bonding material to prevent the windings from devolving into a spaghetti-like mess of yarn once removed from the jig 20. Through this process, each pass of the continuous strand of yarn 12 across the jig 20 would form a discrete yarn strand 26 within the overall yarn structure 10. Moreover, these created yarn strands 26 may be aligned and spaced within the textile 10 as required by the final design.

In this construction, while certain yarn strands 26 may overlap with other yarn strands throughout the textile panel, they would not be interconnected with those overlapping yarn strands within the workspace area 14 except through the subsequently bonding material. In many embodiments, the bonding material may be deposited across the yarn strands 26 periodically such that for any given strand, there would portions or points that are uncovered by the bonding material (i.e., the "unbonded portions") and other portions or points that would contacted by the bonding material (i.e., the "bonded portions"), where the bonded and unbonded portions may alternate along the length of a yarn strand 26.

The total collection of yarn strands 26 extending across the engineered textile 10 may include various subsets, where within an given subset, the respective yarn strands 26 of that subset are aligned with each other (either in a parallel or substantially parallel manner, or else extending at angles to each other while originating from a common point).

The continuous strands of yarn 12 that are strung across the jig 20 may include any suitable elongate material to meet the design requirements of the engineered textile 10. If multiple different yarns are utilized, these yarns need not be the same, and could have longitudinal stretch parameters/elasticities that are selected according to the purpose of the final textile. For example, in one embodiment, all yarn strands extending in a first direction or from a first location/pin/grouping of pins may have a first modulus of elasticity, while all strands extending in a second direction or from a second location/pin/grouping of pins may have a second modulus of elasticity that is different than the first modulus of elasticity. In another embodiment, the modulus elasticity of a plurality of yarn strands aligned in a parallel arrangement may vary from a first yarn strand on a first end to a second yarn strand on a second end that is opposite the first end. In doing so, a designer may engineer the textile to have a greater elasticity in one dimension than a similarly measured elasticity in a second dimension, or that zonally varies across a width of the engineered textile.

With continued reference to FIG. 1, in some embodiments, the jig 20 may be embodied as a table, a substrate, a dimensional model, or an open frame such as shown. The plurality of upstanding pins 22 may extend upward/away from an outer surface 28 of this structure. In some embodiments, the pins 22 may extend orthogonally outward from this outer surface 28, while in other embodiments, one or more of the pins 22 may have a slight camber away from the central workspace area 14 of the jig 20. Use of a camber may tend to inhibit the strands from slipping off the free end of the pin 22 by encouraging the strand to be drawn toward the root of the pin 22 via the pin-angle directed away from the direction of applied tension.

As shown in FIG. 1, in an effort to reduce excess material wastage (i.e., lengths of yarn extending beyond the intended outer perimeter of the final engineered textile panel, which may ultimately be trimmed off prior to final assembly), the jig 20 may comprise a pin arrangement that generally approximates the outer peripheral design of the final textile panel. As shown, the plurality of pins 22 may assume an ordered path around the central workspace area 14, with specific pin locations being dependent on where the respective yarn strands are intended to originate/terminate. In this manner, the relative spacing 32 of the pins 22 may be constant or may be variable around the perimeter of the jig 20 to vary the functional strengths of the textile and/or the strand density within the engineered textile. Further, in many embodiments, the pin arrangement may form a non-linear path, may include non-linear segments, and/or may be piecewise linear (comprising a plurality of linear sub-segments) as it traverses this path along the frame 30.

Creating the final yarn structure 10 (and resulting engineered textile) may necessitate locating the superposed yarn strands 26 in a tensioned, crisscrossed pattern on the jig 20 prior to interconnecting the yarn strands 26 with the bonding material to ensure material integrity. Locating the superposed yarn strands 26 may include manually or robotically anchoring an end of the continuous strand of yarn 12, then winding a first continuous strand of yarn 12 in a first zigzag pattern around a first select set of the pins 22. One or more additional continuous strands of yarn 12 may also be anchored and wound in similar or different zigzag patterns around sets of pins 22. Once complete the overall collection of yarn strands (i.e., the yarn structure 10) may be stretched across the central region 14 of the jig 20 to form the underlying structure of the engineered textile. For a footwear application, the anchoring points of the individual yarn strands, the direction or directions of elongation of the individual yarn strands, the points of overlap of the yarn strands, and/or the locations of joining the yarn strands may be data mapped to an intended user's foot/feet to provide, for example, improved foot retention, comfort, performance, energy return, etc.

FIGS. 2-5 schematically illustrate one embodiment of a system 50 for automatically winding one or more continuous strands of yarn 12 around a plurality of retention pins 22 provided on a jig 20 to form a plurality of discrete yarn strands 26. For simplicity in the following description, the continuous strands of yarn 12 may be generically referred to as "yarn 12" or "spooled yarn 12" however this is to be distinguished from the "yarn strands 26," which is intended to refer to the linear segments of yarn extending across the workspace area 14.

Figure 3:
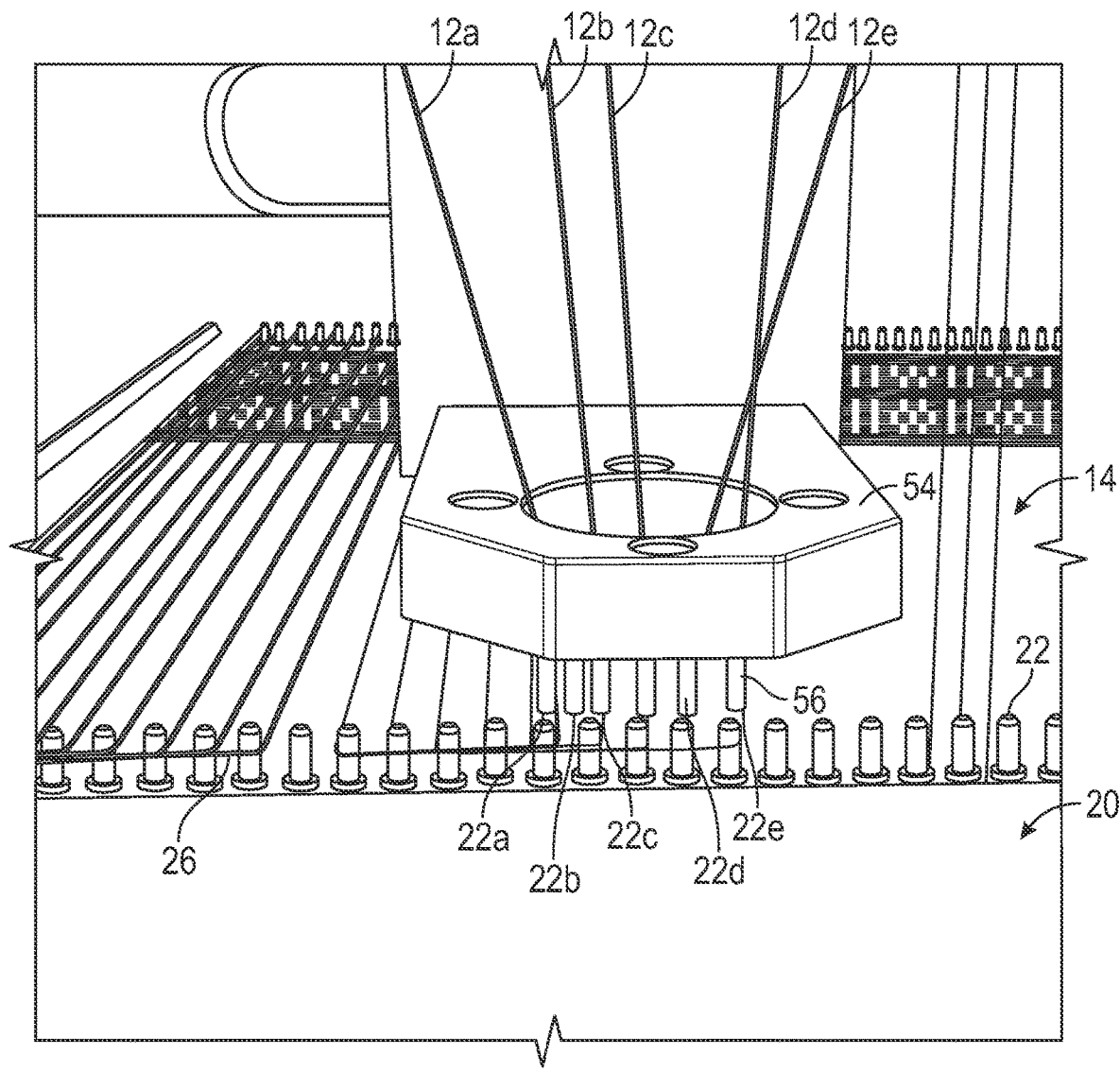
FIG. 3 schematically illustrates a winding head for use with the system of FIG. 2.

As generally shown, the system 50 utilizes a movable winding guide or head 54 (best shown in FIGS. 3-5) to controllably direct the yarn 12 back and forth across the central workspace area 14 of the jig and around the upstanding pins 22. To more precisely control the placement of the yarn 12, the winding head 54 may include one or more guide tubes 56 through which the yarn 12 may pass, such as shown in FIG. 3. The guide tubes 56 may be a tubular element that has a central lumen/opening operative to route the yarn 12 into the workspace area 14. This central lumen may extend through a portion or the entirety of the tube and the threads 12 may exit out a distal end of the tube 56. The guide tubes 56 may be fixedly or movably joined to the head 54 and may serve to controllably locate the yarn 12 within the plane of the workspace during operation.

The yarn 12 may be supplied via a bobbin or spool 58 (shown in FIG. 2) and may be tensioned during use via a suitable tensioning device 56. In some embodiments, the tensioning device may comprise a brake or clamp that restricts the rate at which the yarn 12 may be supplied through the winding head 54. In other embodiments, the tensioning device may be a spring or other torque control device that may act on the spool to control or resist the unspooling of the yarn 12 from the spool 58. The tensioning device may operate actively or passively and may act either directly on the yarn 12 or on the spool 58. Examples of active tensioners may include one or more electronically controlled clamps, brakes, or automatic feeders that may controllably resist or controllably supply the feed of the yarn 12 to/through the head 54. Conversely, passive tensioners may lack any ability for direct control, but instead may include one or more friction elements (grommets, mechanical contacts, and the like) that simply resist the unconstrained unspooling or passage of yarn through the winding head 54.

In some embodiments, the tensioning device may be operative to control the residual tension or strain in each yarn strand 26 as it is wound around the upstanding pins 22 on the jig 20. In some embodiments, a first plurality of yarn strands may be drawn across the workspace such that they maintain a first amount of strain/tension while a second plurality of yarn strands may be drawn across the workspace such that they maintain a second amount of strain/tension that is different than the first amount of strain/tension. In other embodiments, each yarn strand 26 may be wound with a similar amount of strain/tension, however, a modulus of a first plurality of yarn strands may be different than a modulus of a second plurality of yarn strands. In this manner, some yarn strands may be more elastically stretched during the winding process, and once removed from the jig 20, they may be inclined to revert to a less stretched state. In an engineered textile utilizing this multi-modulus yarn structure, by winding under tension, the yarn strands with the greater modulus may serve as a lock-out structure that may provide a piecewise-smooth stress/strain response. Said another way, when starting from a relaxed state, the lower modulus strands (which have since contracted from their elongated state during winding) may be allowed to stretch a predetermined amount before the higher modulus strands (which may begin in a coiled state due to the contraction of the lower modulus fibers) become taught and engage to stiffen or "lock-out" the textile from further stretch (i.e., or greatly reduce the rate at which it is capable of stretching).

The winding head 54 may be moved throughout the central workspace area 14 of the jig 20 in at least two dimensions via a suitable movement mechanism 60. The movement mechanism 60 may include one or more servomotors, linear and rotational transducers, pneumatic actuators, hydraulic actuators, or any other type of logically applicable actuation mechanism. In one embodiment, the movement mechanism 60 may be embodied, for example, as a gantry system that includes a carriage 62 that is controllably movable in two dimensions on a suitable support track 64. In other embodiments, the movement mechanism 60 may comprise a multi-degree of freedom robotic arm and/or a workpiece manipulator to operatively control the winding of the yarn around a 3-dimensional body (e.g., a last).

Figure 2:
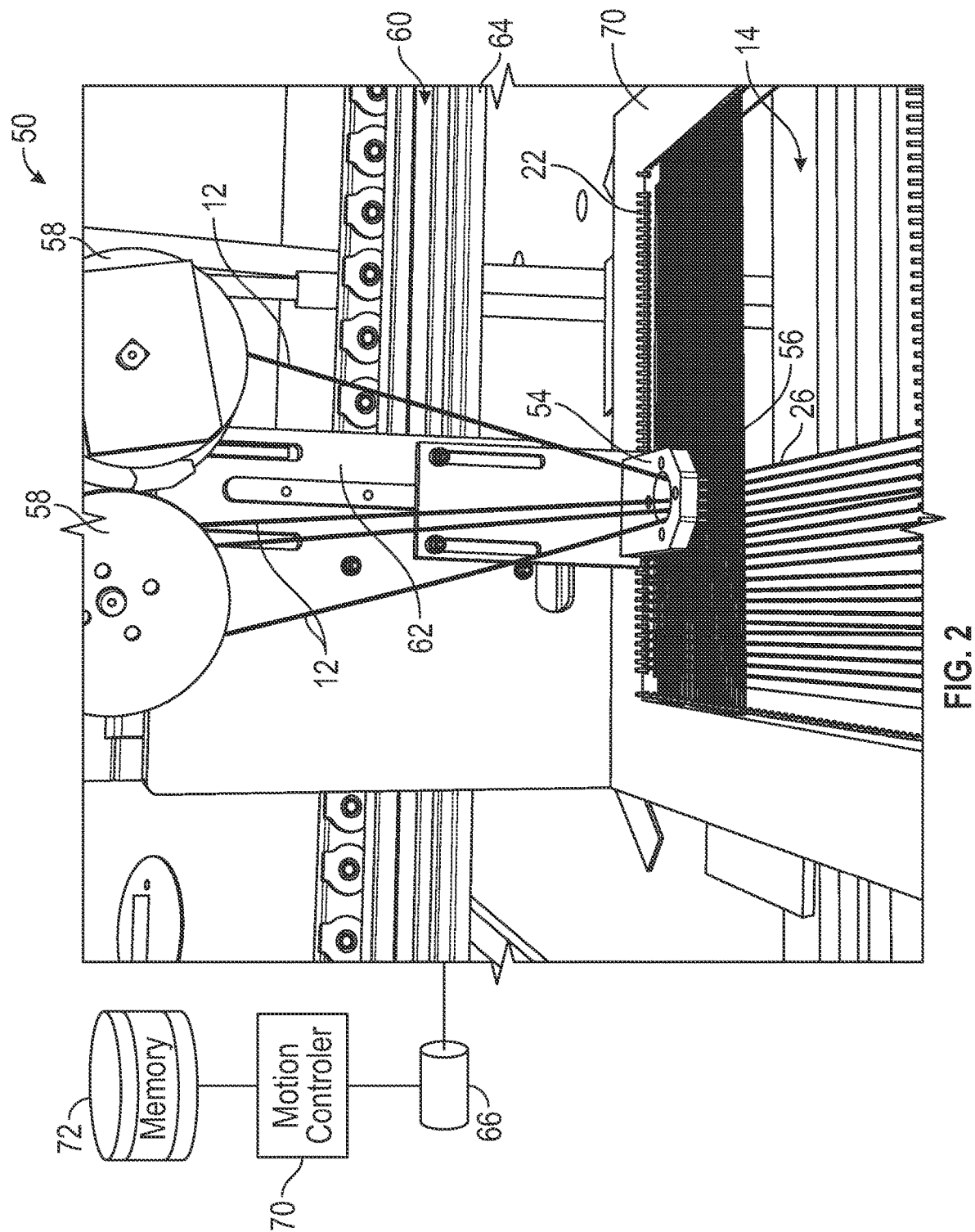
FIG. 2 schematically illustrates an embodiment of an automated winding machine for creating a multi-directional yarn structure having a plurality of yarn strands extending linearly across a workspace of a pin-jig such as shown in FIG. 1.

With continued reference to FIG. 2, the movement mechanism 60 used to control the positioning of the winding head 54 throughout the workspace/central region 14 may operate at the direction of a suitable motion controller 70 (also referred to herein as a "winding controller 70"). The motion controller 70 may include any required power electronic circuitry, control circuitry, processing capabilities, and processor-executable code that may be required to operatively control the motion of the winding head 54 via the one or more actuators 66 included with the movement mechanism 60. The motion controller 70 may further include logic circuits, Application Specific Integrated Circuit(s) (ASIC), electronic circuit(s), central processing unit(s) (e.g., microprocessor(s)), input/output circuit(s) and devices, appropriate signal conditioning and buffer circuitry, and other components to provide the described functionality, etc. The motion controller 70 includes, or may be in communication with an associated memory 72 and storage (e.g., read only, programmable read only, random access, hard drive, tangible, etc), whether resident, remote or a combination of both, that is operative to store processor-executable software, firmware programs, modules, routines, used to direct the operation of the movement mechanism 60 when executed by the motion controller 70.

While it may be possible to wind the yarn structure using a only single yarn, such a system may present challenges in a traditional manufacturing context where machine throughput is often a large concern. To improve machine throughput, the system 50 may be configured to simultaneously wind/string a plurality of yarns across the central region 14 of the jig 20. In such an embodiment, the system 50 may include a multi-strand winding head 54 that includes a plurality of adjacently spaced guide tubes 56 that form a guide tube array 100. Within this array 100, each guide tube 56 may be substantially similar to the other guide tubes 56, and they may all be spaced a common separation distance 102 from immediately adjacent tubes within the array 100. When in use, each respective guide tube 56 is operative to receive a different respective yarn 12 through its central lumen and may deliver the respective yarn, in a tensioned state, within the workspace/central region 14 of the jig 20.

Figure 4:
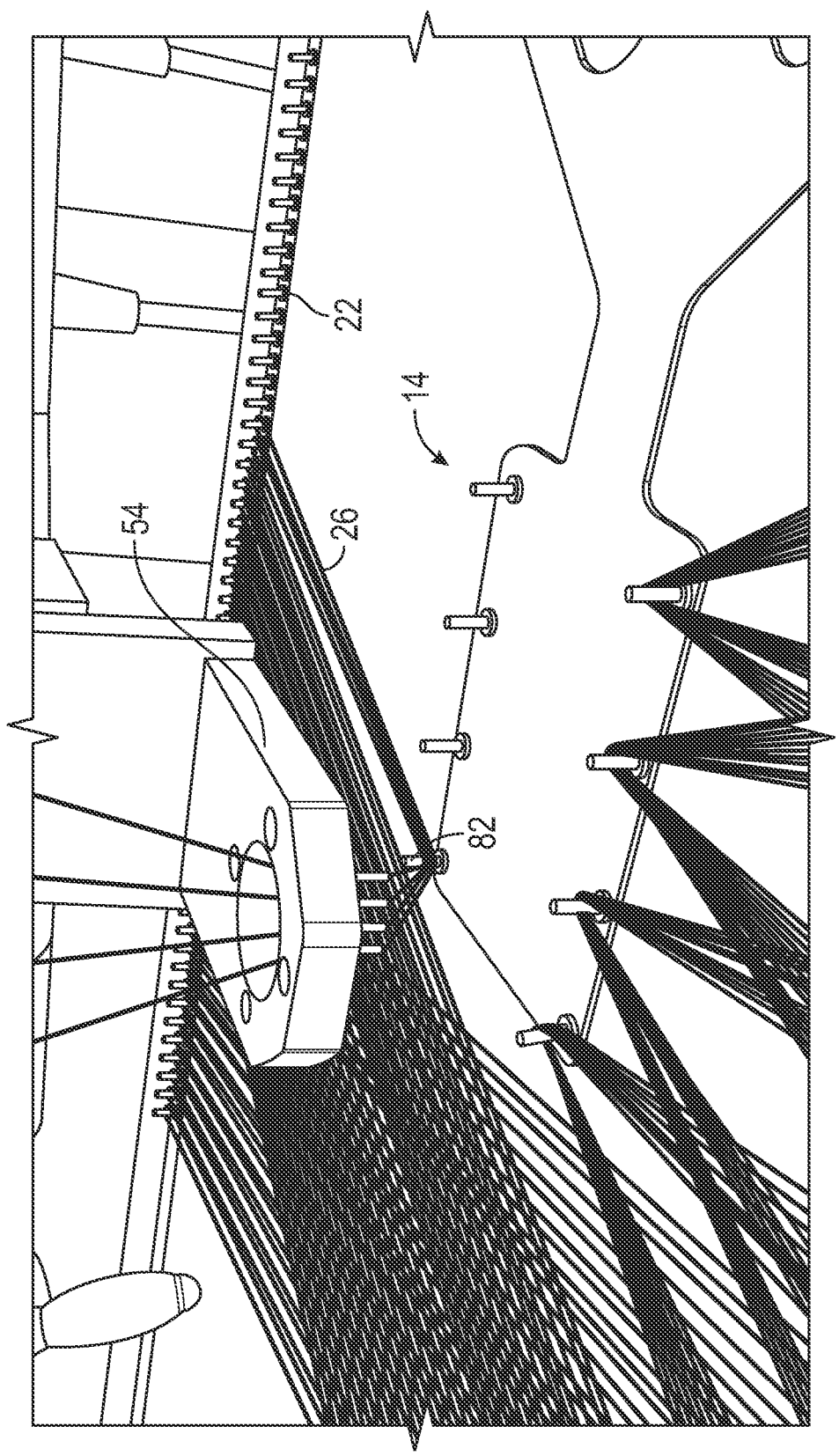
FIG. 4 schematically illustrates an embodiment of an automated winding machine for creating a multi-directional yarn structure having a plurality of yarn strands extending linearly across a workspace of a pin-jig such as shown in FIG. 1.
Figure 5:
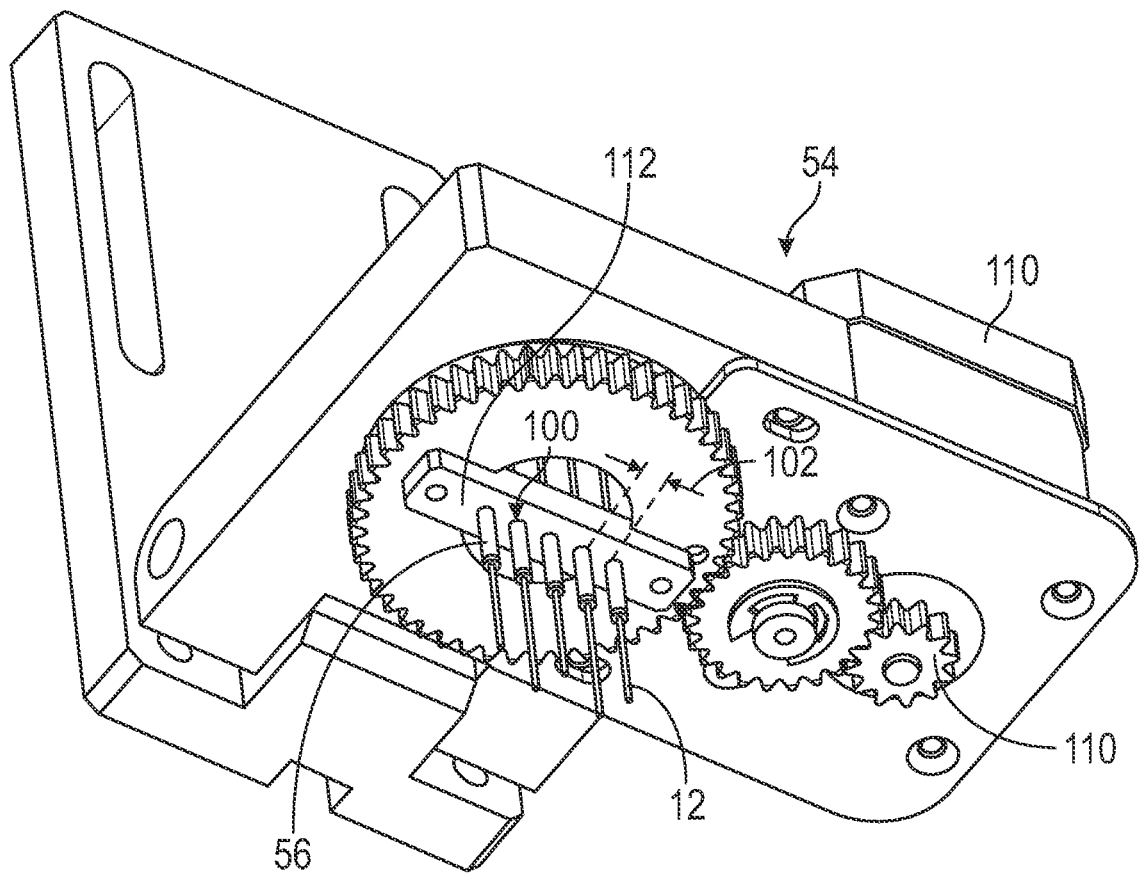
FIG. 5 schematically illustrates a bottom perspective view of a winding head with a rotatable array of guide tubes.

FIGS. 3-5 better illustrate embodiments of a multi-strand winding head 100 that may simultaneously draw multiple separate yarn strands 26 across the workspace/central region 14. As may be appreciated, winding multiple yarn strands at once may increase the overall winding speed and efficiency, which may allow for a greater production throughput and lower associated energy usage. Multi-strand winding can further enable unique visual appearances, such as by using a plurality of different colors within the array. In some configurations, multiple yarns, each having a different color or elasticity may be fed through a single guide to provide a unique appearance. In some configurations, the winding head may simultaneously draw each of a plurality of yarns (12a, 12b, 12c, 12d, 12e) around a different respective one of a plurality of upstanding pins (22a, 22b, 22c, 22d, 22e). As generally shown in FIG. 4, for some applications the winding head 54 may alternatively draw each of a plurality of yarns (12a, 12b, 12c, 12d, 12e)) from a different respective pin along the perimeter of the jig 20 to/around a single upstanding pin 82 provided in a central portion of the jig 20. By winding multiple yarns elements around a single pin 82, the system may, for example, create a dynamic eyelet or attachment point that may be in structural communication with multiple points along the perimeter and across a broader area of the textile.

In some embodiments, such as schematically shown in FIG. 5, the winding head 54 may include a rotatable drive/rotation motor 110 that is operative to alter the collective alignment of the guide tube array 100 (i.e., relative to the winding head 54). In one configuration, the guide tube array 100 may be mounted on a rotatable base 112 that may be rotated via the drive 110. In some embodiments, the rotation motor 110 may include, for example, a stepper motor that is controllable via a suitable computer numerical controlled software/firmware/processing device and that is coupled to the rotatable base via a gear train, belt, linkage, or other suitable coupling mechanism.

Figure 6:
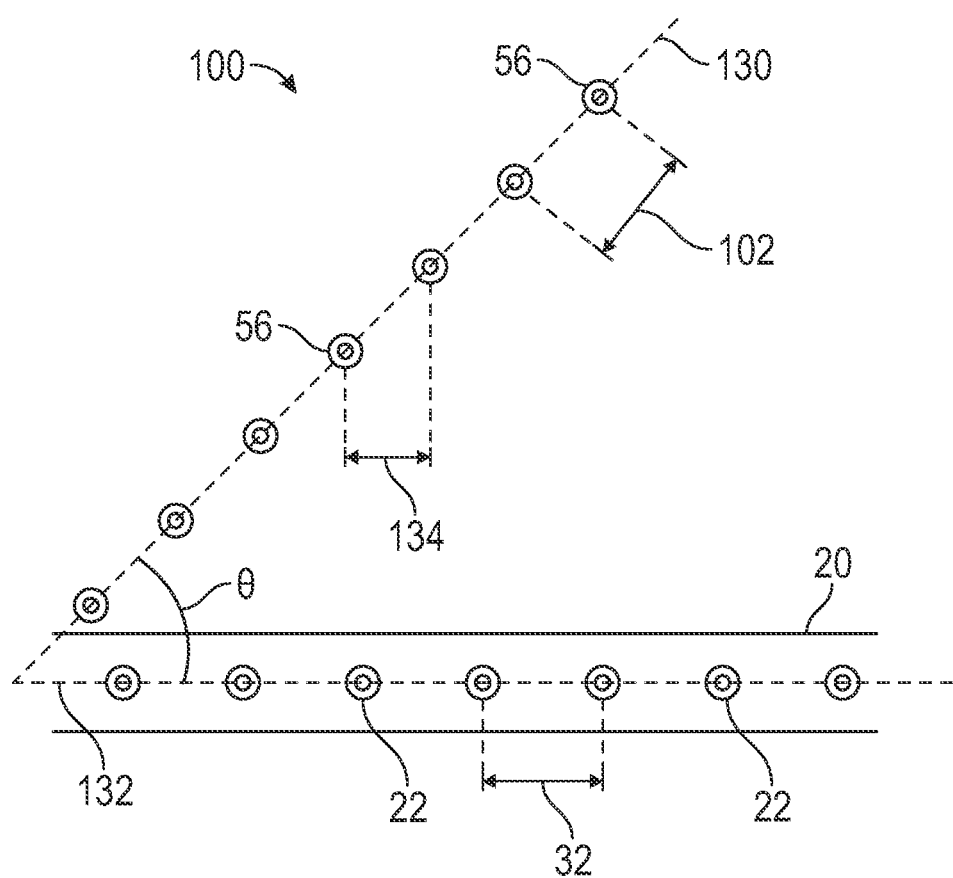
FIG. 6 schematically illustrates a diagram of yarn guide alignment relative to pin alignment.

During operation, rotation of the guide tube array 100 relative to the pin arrangement may have the effect of varying a projected separation distance between the guide tubes 56 within the array. More specifically, if the guide tube array 100 is parallel to the pin arrangement that it seeks to pass between, then separation distance between the guide tubes 102 would equal the actual separation distance 32 of the pins. As shown in FIG. 6, if the array 100 has an alignment 130 that is angled relative to an alignment 132 of the pins 22 (i.e., by an array angle θ), then the projected spacing 134 of the guide tubes 56 would be less than the actual spacing 102 by a factor of cos(θ). In doing so, the present guide array may effectively have a variable guide-tube separation distance that can accommodate different pin spacings across the jig 20. Alternatively, if a common pin spacing is utilized across the jig, then rotation of the guide tube array 100 may be required to ensure that the array always passes between the pins 22 at a common relative orientation (i.e., at a common array angle θ). In this manner, the present system may accommodate different jigs having different pin spacings by simply ensuring that the projected separation distance 134 equals the spacing of the pins.

Understanding this operation, the winding controller 70 may further be in electrical communication with the rotation motor 110, and wherein the instructions, when executed by the winding controller 70, cause the rotation motor 110 to rotate the rotatable base 112 of the winding head 54 and alter the alignment/orientation 130 of the linear array 100. In one embodiment, the winding controller 70 may control this orientation 130 as a function of the position of the winding head 54 relative to the jig 20/central workspace area 14. Similarly, in an embodiment, the winding controller 70 may control this orientation 130 as a function of the position of the winding head 54 relative to the pins 22 the guide tubes 56 seek to pass between. For example, in one embodiment, the linear array 100 may consistently exit the central workspace area 14 at a first array angle θ, and may consistently reenter the central workspace area 14 at a second array angle θ. Likewise, in some embodiments, the winding controller 70 may control the orientation 130 of the linear array 100 such that the array angle θ when exiting the central workspace area 14 is either the same as, or the supplementary angle of the array angle θ when reentering. Alternatively, the winding controller 70 may dynamically adjust the array angle θ to adapt to a variable pin spacing across the jig 20.

While the present disclosure discusses the yarn guides as guide tubes 56. In other embodiments, these tubes may be more akin to sewing needles, or may have an elongate plate or cylindrical body with a guide hole extending transversely through the body at the distal end. Other similar yarn guides may similarly be used with the present system as may be appreciated by a person of skill in the art in view of the present teachings, however a tubular style with the yarn extending out of the distal end does have the advantage of reducing any winding around the guide itself as the linear array rotates.

Aspects of this disclosure may be implemented, for example, through a computer-executable program of instructions, such as program modules, generally referred to as software applications or application programs executed by any of a controller or the controller variations described herein. Software may include, in non-limiting examples, routines, programs, objects, components, and data structures that perform particular tasks or implement particular data types. The software may form an interface to allow a computer to react according to a source of input. The software may also cooperate with other code segments to initiate a variety of tasks in response to data received in conjunction with the source of the received data. The software may be stored on any of a variety of memory media, such as CD-ROM, magnetic disk, bubble memory, and semiconductor memory (e.g., various types of RAM or ROM).

Moreover, aspects of the present disclosure may be practiced with a variety of computer-system and computer-network configurations, including multiprocessor systems, microprocessor-based or programmable-consumer electronics, minicomputers, mainframe computers, and the like. In addition, aspects of the present disclosure may be practiced in distributed-computing environments where tasks are performed by resident and remote-processing devices that are linked through a communications network. In a distributed-computing environment, program modules may be located in both local and remote computer-storage media including memory storage devices. Aspects of the present disclosure may therefore be implemented in connection with various hardware, software or a combination thereof, in a computer system or other processing system.

Any of the methods described herein may include machine readable instructions for execution by: (a) a processor, (b) a controller, and/or (c) any other suitable processing device. Any algorithm, software, control logic, protocol or method disclosed herein may be embodied as software stored on a tangible medium such as, for example, a flash memory, a CD-ROM, a floppy disk, a hard drive, a digital versatile disk (DVD), or other memory devices. The entire algorithm, control logic, protocol, or method, and/or parts thereof, may alternatively be executed by a device other than a controller and/or embodied in firmware or dedicated hardware in an available manner (e.g., implemented by an application specific integrated circuit (ASIC), a programmable logic device (PLD), a field programmable logic device (FPLD), discrete logic, etc.). Further, although specific algorithms are described with reference to flowcharts depicted herein, many other methods for implementing the example machine-readable instructions may alternatively be used.

Aspects of the present disclosure have been described in detail with reference to the illustrated embodiments; those skilled in the art will recognize, however, that many modifications may be made thereto without departing from the scope of the present disclosure. The present disclosure is not limited to the precise construction and compositions disclosed herein; any and all modifications, changes, and variations apparent from the foregoing descriptions are within the scope of the disclosure as defined by the appended claims. Moreover, the present concepts expressly include any and all combinations and subcombinations of the preceding elements and features. Further embodiments and examples of the present systems and disclosure are provided in the following clauses.

Clause 1. A system for forming a yarn structure for an engineered textile includes: a jig having a plurality of upstanding pins that collectively circumnavigate a central workspace area; an automatic winding system comprising: a movement mechanism and a winding head coupled with the movement mechanism, the movement mechanism comprising one or more motors that are configured to translate the winding head across the workspace area the winding head comprising: a plurality of yarn guides arranged in a linear array and extending from a rotatable base; a rotation motor coupled to the rotatable base and configured to selectively rotate the base to alter an orientation of the linear array.

Clause 2. The system of clause 1, further comprising a winding controller in electrical communication with the one or more motors of the movement mechanism; and wherein the winding controller comprises a digital memory having stored therein instructions that when executed by the winding controller, cause the one or more motors to translate the winding head across the workspace area along a predefined path.

Clause 3. The system of clause 2, wherein the winding controller is further in electrical communication with the rotation motor, and wherein the instructions, when executed by the winding controller, cause the rotation motor to rotate the rotatable base of the winding head and alter the orientation of the linear array.

Clause 4. The system of clause 3, wherein the winding controller is configured to cause the rotation motor to rotate the rotatable base of the winding head as a function of the position of the winding head within the workspace.

Clause 5. The system of clause 3 or 4, wherein the winding controller is configured to cause the rotation motor to rotate the rotatable base of the winding head as a function of an arrangement of the plurality of upstanding pins and further as a function of the position of the winding head relative to the arrangement of the plurality of pins.

Clause 6. The system of any of clauses 3-5, wherein the movement mechanism is operative to translate the winding head across the workspace and such that: a yarn guide of the plurality of yarn guides exits the workspace area by passing between a first pair of adjacent upstanding pins from the plurality of upstanding pins; and reenters the workspace area by passing between a second pair of adjacent upstanding pins from the plurality of upstanding pins.

Clause 7. The system of any of clauses 1-6 wherein: the linear array of yarn guides defines a yarn guide orientation vector that is a best fit line through each of the plurality of yarn guides; the first pair of upstanding pins at least partially define a first pin-alignment vector that is a best fit line through at least the first pair of upstanding pins; and the second pair of upstanding pins at least partially define a second pin-alignment vector that is a best fit line through at least the second pair of upstanding pins; a first exit angle is defined as an angle formed between the yarn guide orientation vector and the first pin-alignment vector at the moment the pin exits the workspace area between the first pair of upstanding pins; a first reentry angle is defined as an angle formed between the yarn guide orientation vector and the second pin-alignment vector at the moment the pin reenters the workspace between the second pair of upstanding pins; and wherein the winding controller is configured to adjust the orientation of the linear array of yarn guides such that first exit angle is identical to the first reentry angle.

Clause 8. The system of clause 6 wherein the movement mechanism is operative to translate the winding head across the workspace and such that: the yarn guide of the plurality of yarn guides exits the workspace area a subsequent time by passing between a third pair of adjacent upstanding pins from the plurality of upstanding pins; and reenters the workspace area a subsequent time by passing between a fourth pair of adjacent upstanding pins from the plurality of upstanding pins; and wherein: the third pair of upstanding pins at least partially define a third pin-alignment vector that is a best fit line through at least the third pair of upstanding pins; and the fourth pair of upstanding pins at least partially define a fourth pin-alignment vector that is a best fit line through at least the fourth pair of upstanding pins; a second exit angle is defined as an angle formed between the yarn guide orientation vector and the third pin-alignment vector at the moment the pin exits the workspace area between the third pair of upstanding pins; a second reentry angle is defined as an angle formed between the yarn guide orientation vector and the fourth pin-alignment vector at the moment the pin reenters the workspace between the fourth pair of upstanding pins; and wherein the winding controller is configured to adjust the orientation of the linear array of yarn guides such that first exit angle is identical to the second exit angle and the first reentry angle is identical to the second reentry angle.

Clause 9. The system of any of clauses 1-8, wherein each yarn guide of the plurality of yarn guides includes a tube having a proximal end attached to the rotatable base and a distal end that extends into the workspace area.

Clause 10. The system of clause 9, further comprising a plurality of continuous strands of yarn, each continuous strand extending through a different respective yarn guide of the plurality of yarn guides, and wherein winding head is operative to draw the plurality of continuous strands of yarn across the workspace area from the distal end of each of the plurality of yarn guides.

Clause 11. The system of clause 10, further comprising a tensioner in communication with each of the plurality of continuous strands of yarn, the tensioner configured to maintain a predefined, constant amount of tension on the yarn.

Clause 12. The system of any of clauses 1-11, wherein the movement mechanism is a gantry system operative to controllably move the winding head in two dimensions.

Clause 13. An automatic winding system for winding a plurality of tensile strands across a jig having a plurality of upstanding peripheral retention pins disposed around a central workspace area, the system comprising: a winding head, the winding head including: a rotatable base; a plurality of yarn guides arranged in a linear array and extending from the rotatable base; a rotation motor coupled to the rotatable base and configured to selectively rotate the base to alter an orientation of the linear array. a movement mechanism coupled with the winding head and including a plurality of motors operative to controllably translate the winding head across the workspace area; a plurality of continuous strands of yarn, each continuous strand extending through a different respective yarn guide of the plurality of yarn guides; and a winding controller in electrical communication with each of the plurality of motors of the movement mechanism, wherein the winding controller is configured to operate the movement mechanism to draw the plurality of continuous strands of yarn across the workspace area between and around the plurality of upstanding peripheral retention pins.

Clause 14. The automatic winding system of clause 13, wherein the winding controller is further in communication with the rotation motor and is configured to cause the rotation motor to rotate the rotatable base of the winding head and alter the orientation of the linear array.

Clause 15. The automatic winding system of clause 14, wherein the winding controller is configured to cause the rotation motor to rotate the rotatable base of the winding head as a function of the position of the winding head within the workspace.

Clause 16. The automatic winding system of any of clauses 13-15, further comprising a tensioner in communication with each of the plurality of continuous strands of yarn, the tensioner configured to maintain a predefined, constant amount of tension on the yarn.

Clause 17. The automatic winding system of any of clauses 13-16, wherein the movement mechanism is a gantry system operative to controllably move the winding head in two dimensions.

The invention claimed is:

1. A system for forming a non-woven, yarn structure for an engineered textile, the system comprising:
a jig having a plurality of upstanding pins that collectively circumnavigate a central workspace area;
an automatic winding system comprising:
a movement mechanism and a winding head coupled with the movement mechanism,
the movement mechanism comprising one or more motors that are configured to translate the winding head across the workspace area;
the winding head comprising:
a rotatable base;
a plurality of yarn guides arranged in a linear array and extending from the rotatable base;
a rotation motor coupled to the rotatable base and configured to selectively rotate the rotatable base independently from other parts of the winding head to alter an orientation of the linear array.

2. The system of claim 1, further comprising a winding controller in electrical communication with the one or more motors of the movement mechanism; and wherein the winding controller comprises, or is in digital communication with a digital memory having stored therein instructions that when executed by the winding controller, cause the one or more motors to translate the winding head across the workspace area along a predefined path.

3. The system of claim 2, wherein the winding controller is further in electrical communication with the rotation motor, and wherein the instructions, when executed by the winding controller, cause the rotation motor to rotate the rotatable base of the winding head and alter the orientation of the linear array.

4. The system of claim 3, wherein the winding controller is configured to cause the rotation motor to rotate the rotatable base of the winding head as a function of the position of the winding head within the workspace.

5. The system of claim 3, wherein the winding controller is configured to cause the rotation motor to rotate the rotatable base of the winding head as a function of an arrangement of the plurality of upstanding pins and further as a function of the position of the winding head relative to the arrangement of the plurality of pins.

6. The system of claim 3, wherein the movement mechanism is operative to translate the winding head across the workspace and such that:
a yarn guide of the plurality of yarn guides exits the workspace area by passing between a first pair of adjacent upstanding pins from the plurality of upstanding pins; and
reenters the workspace area by passing between a second pair of adjacent upstanding pins from the plurality of upstanding pins; and
further wherein:
the linear array of yarn guides defines a thread guide orientation vector that is a best fit line through each of the plurality of yarn guides;
the first pair of upstanding pins at least partially define a first pin-alignment vector that is a best fit line through at least the first pair of upstanding pins; and
the second pair of upstanding pins at least partially define a second pin-alignment vector that is a best fit line through at least the second pair of upstanding pins;
a first exit angle is defined as an angle formed between the yarn guide orientation vector and the first pin-alignment vector at the moment the pin exits the workspace area between the first pair of upstanding pins; and a first reentry angle is defined as an angle formed between the thread guide orientation vector and the second pin-alignment vector at the moment the pin reenters the workspace between the second pair of upstanding pins.

7. The system of claim 6 wherein: the winding controller is configured to adjust the orientation of the linear array of yarn guides such that first exit angle is identical to the first reentry angle.

8. The system of claim 6 wherein the movement mechanism is operative to translate the winding head across the workspace and such that:
the yarn guide of the plurality of yarn guides exits the workspace area a subsequent time by passing between a third pair of adjacent upstanding pins from the plurality of upstanding pins; and
reenters the workspace area a subsequent time by passing between a fourth pair of adjacent upstanding pins from the plurality of upstanding pins; and
wherein:
the third pair of upstanding pins at least partially define a third pin-alignment vector that is a best fit line through at least the third pair of upstanding pins; and
the fourth pair of upstanding pins at least partially define a fourth pin-alignment vector that is a best fit line through at least the fourth pair of upstanding pins;
a second exit angle is defined as an angle formed between the thread guide orientation vector and the third pin-alignment vector at the moment the pin exits the workspace area between the third pair of upstanding pins;
a second reentry angle is defined as an angle formed between the yarn guide orientation vector and the fourth pin-alignment vector at the moment the pin reenters the workspace between the fourth pair of upstanding pins; and
wherein the winding controller is configured to adjust the orientation of the linear array of yarn guides such that first exit angle is identical to the second exit angle and the first reentry angle is identical to the second reentry angle.

9. The system of claim 1, wherein each yarn guide of the plurality of yarn guides includes a tube having a proximal end attached to the rotatable base and a distal end that extends into the workspace area.

10. The system of claim 9, further comprising a plurality of continuous strands of yarn, each continuous strand of yarn extending through a different respective yarn guide of the plurality of yarn guides, and wherein the winding head is operative to draw the plurality of continuous strands of yarn across the workspace area from the distal end of each of the plurality of yarn guides.

11. The system of claim 10, further comprising a tensioner in communication with each of the plurality of continuous strands of yarn, the tensioner configured to maintain a predefined amount of tension on the yarn.

12. The system of claim 1, wherein the movement mechanism is a gantry system operative to controllably move the winding head in two dimensions.

13. An automatic winding system for winding a plurality of yarn strands across a jig having a plurality of upstanding peripheral retention pins disposed around a central workspace area, the system comprising:
a winding head, the winding head including:
a rotatable base;
a plurality of yarn guides arranged in a linear array and extending from the rotatable base;
a rotation motor coupled to the rotatable base and configured to selectively rotate the rotatable base independently from other parts of the winding head to alter an orientation of the linear array;
a movement mechanism coupled with the winding head and including a plurality of motors operative to controllably translate the winding head across the workspace area;
a plurality of continuous strands of yarn, each continuous strand of yarn extending through a different respective yarn guide of the plurality of yarn guides; and
a winding controller in electrical communication with each of the plurality of motors of the movement mechanism, wherein the winding controller is configured to operate the movement mechanism to draw the plurality of continuous strands of yarn across the workspace area between and around the plurality of upstanding peripheral retention pins.

14. The automatic winding system of claim 13, wherein the winding controller is further in communication with the rotation motor and is configured to cause the rotation motor to rotate the rotatable base of the winding head and alter the orientation of the linear array.

15. The automatic winding system of claim 14, wherein the winding controller is configured to cause the rotation motor to rotate the rotatable base of the winding head as a function of the position of the winding head within the workspace.

16. The automatic winding system of claim 13, further comprising a tensioner in communication with each of the plurality of continuous strands of yarn, the tensioner configured to maintain a predefined amount of tension on the yarn.

17. The automatic winding system of claim 13, wherein the movement mechanism is a gantry system operative to controllably move the winding head in two dimensions.

* * * * *